Feb. 7, 1961    J. J. EVERARD ET AL    2,970,454
ELECTRIC SWITCHES AND SYSTEMS CONTROLLED THEREBY
Filed Aug. 18, 1959    2 Sheets-Sheet 1

INVENTOR.
JOSEPH J. EVERARD
ROGER D. RULSEH
BY
Arthur R. Woolfolk
ATTORNEY

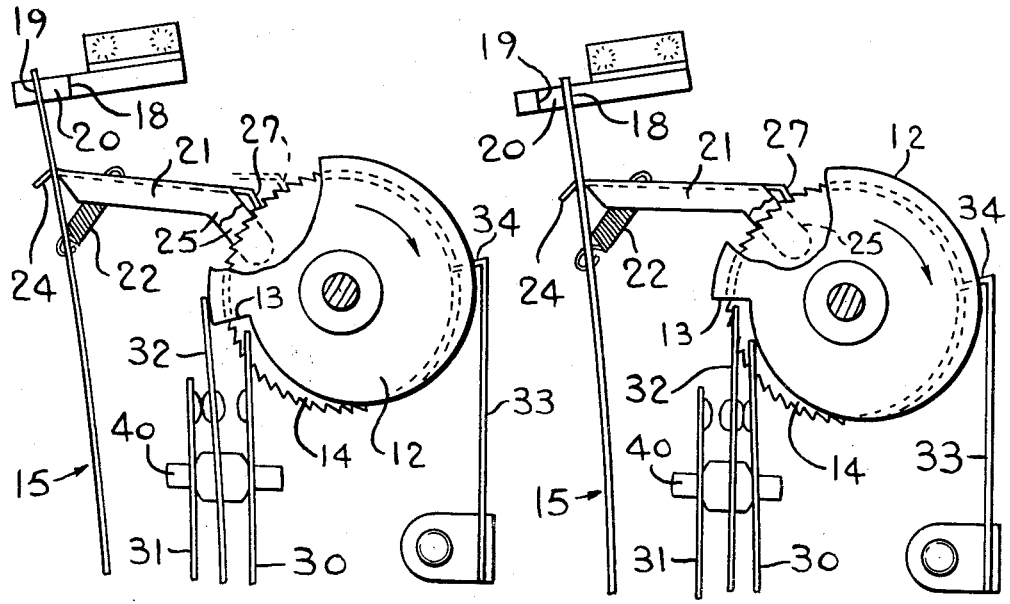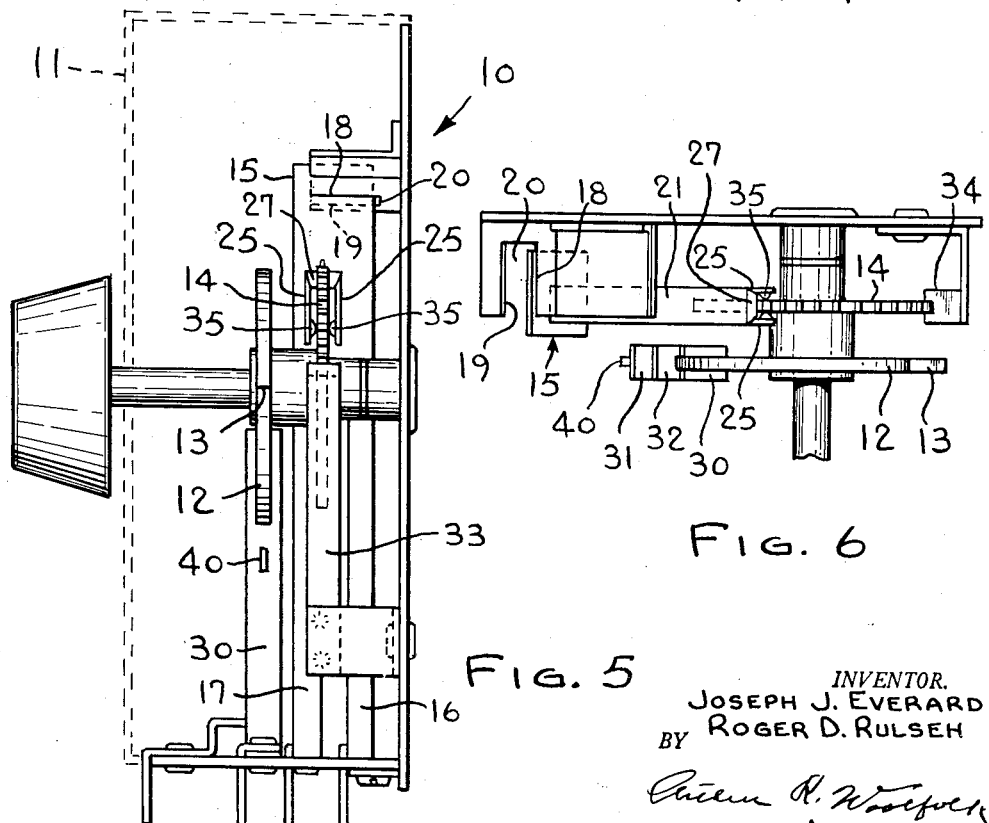

United States Patent Office 2,970,454
Patented Feb. 7, 1961

2,970,454
ELECTRIC SWITCHES AND SYSTEMS CONTROLLED THEREBY

Joseph J. Everard, Manitowoc, and Roger D. Rulseh, Two Rivers, Wis., assignors to Paragon Electric Company, Two Rivers, Wis.

Filed Aug. 18, 1959, Ser. No. 834,436

2 Claims. (Cl. 62—154)

This invention relates to electric switches and systems controlled thereby.

This invention is an improvement over that disclosed in the copending application of Paul W. Timm and Roger D. Rulseh, Serial No. 783,398, filed December 29, 1958, for Electric Switches, and is also an improvement over the application of Joseph J. Everard, Serial No. 613,186, filed October 1, 1956, for Control Means for Defrosting Refrigerators, both of said copending applications being assigned to the same assignee as the present application.

This invention relates to electric switches in which cam means is employed and is advanced in a step-by-step manner by an electric operator and is particularly designed to be advanced by a thermal operator, in which the thermal unit, such as a bimetal member, is used to advance the cam in the step-by-step manner each time a heater or compressor motor or trip means is operated; and which is so made that a single ratchet wheel is employed, preferably rigidly attached to the cam means so that when the thermal element is heated, it moves one or more teeth and has a dog carried by the thermal element a predetermined distance ready to advance the ratchet wheel and thereby ready to advance the cam when the thermal element cools when current through the thermal element or bimetal element is interrupted. Upon cooling, the bimetal element returns to its initial position and advances the ratchet wheel and the cam attached thereto one step.

While the invention is applicable to a number of different systems, it nevertheless is particularly adapted to the defrosting of a refrigerator, or to the control of air conditioning means, or cooling means, or electric signs or other systems, only a few of which are mentioned, wherein two different circuits are employed, and wherein these circuits are controlled in such a manner as to permit energization of either circuit as desired.

A specific object of this invention is to provide cam means so associated with a thermal element, such as a bimetal member, that the cam means is advanced in a step-by-step manner, and in which this advance is made during the cooling period of the thermal element so that no matter how quickly it is heated up, the advance of the cam means is always at the same speed so that no shock is imposed on the mechanism, and in which the cam is so constructed that it will allow the compressor motor to be cut off and a heater turned on in a defrosting system in which it may be used, and in which when the defrosting or heating of the refrigerator is completed, the thermal element will return to its initial position, thus advancing the cam means and allowing reestablishment of the compressor circuit and interruption of the heater circuit, without the use of any trip member whatsoever, and without requiring any lost motion mechanism or any overrunning clutch construction whatsoever.

Further objects are to provide a defrosting means for electric refrigerators in which the timing motor is eliminated and in which any form of trip means such as a solenoid or other device is also eliminated.

Further objects are to provide a defrosting system for electric refrigerators in which the cam controls a multiple contact switch in such a manner that every time the cam completes a revolution or arrives at a preselected point the compressor motor is stopped and a heater element is turned on, and in which a thermal element is provided for advancing the cam in a step-by-step manner whenever the circuit through the thermal element is made and interrupted. In other words further objects of this invention are to provide a system for defrosting a refrigerator in which whenever the compressor motor is started and stopped the cam is advanced one step through the operation of the thermal element and also whenever the heater arranged to hasten defrosting within the refrigerator is started and stopped the cam also is advanced one step and allows the multiple switch to return to its initial position.

An embodiment of the invention is shown in the accompanying drawings in which:

The electric switch is shown in a defrosting system for electric refrigerators but it is to be understood that this showing is illustrative and in no way limiting other than as claimed.

Figure 3 is a fragmentary view of the switch showing the position in which the power element is separated from the motor element of the switch and thereby showing the condition of the switch when the compressor motor circuit has been opened by the switch.

Figure 4 is a similar view to Figure 3 showing the position of the parts when the switch has been returned to its initial position after passing the shoulder on the cam.

Figure 5 is a side view of the switch.

Figure 6 is a top view of the switch.

Figure 1:
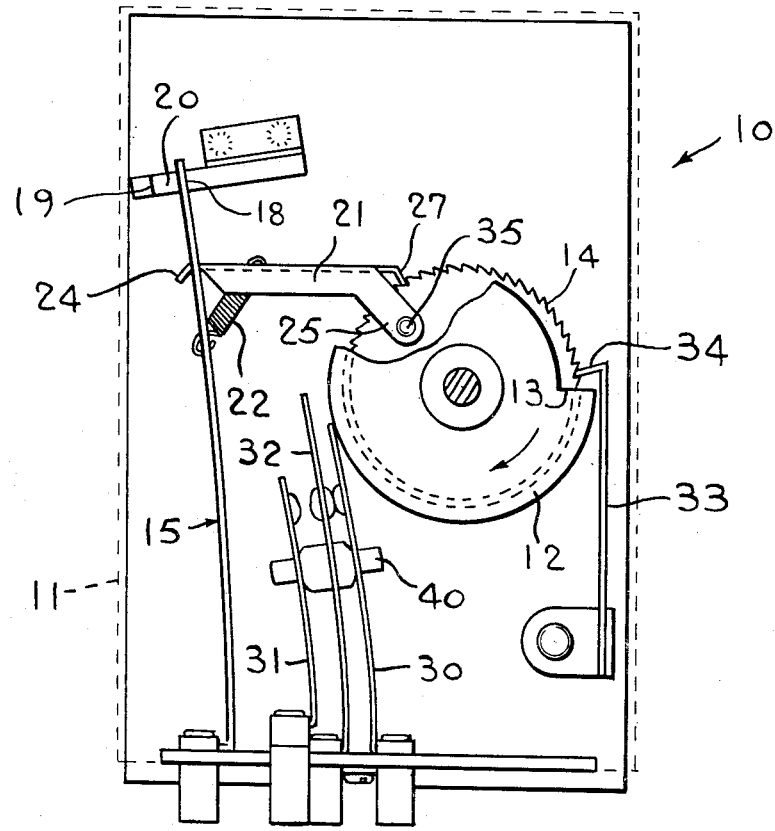
Figure 1 is a front view of the switch with the cover removed.

Referring to Figure 1 it will be seen that the switch as a whole is indicated by the reference character 10. In such figure the cover 11 has been removed to disclose the interior mechanism of the switch.

The switch comprises a cam 12 which is provided with a shoulder or notch 13 and with a ratchet wheel 14 rigid with the cam so that when the ratchet wheel is advanced in a step-by-step manner it will similarly advance the cam in the direction indicated by the arrow in Figure 1.

The advance of the cam is controlled by a thermal element such as a bimetal element indicated by the reference character 15. This bimetal element may have a pair of arms 16 and 17 which are held rigidly at their lower ends as shown in Figure 1 and in which the upper end of the bimetal or thermal element is free to move.

The upper end of the bimetal or thermal element is allowed to move the distance between the two shoulders 18 and 19 of an insulating stop manner provided with a notch or opening 20 in which the upper end of the thermal element 15 is positioned.

Normally the thermal element occupies the position shown in Figure 4 to the right and when it is heated it moves to the left as shown in Figure 3. When the thermal element or bimetal cools it again moves to the right due to its springiness as it is biased to the right.

The bimetal member or thermal element 15 carries a ratchet dog or pawl 21 which is pivoted on the upper end of the bimetal member 15 and is urged downwardly by means of the spring 22. The dog 21 is held in place by means of the spring 22. The bimetal member 15 is provided with an opening 23, see Figure 2, in which a finger 24 of the dog 21 is positioned.

This dog or ratchet pawl 21 is channel shaped and is cut away at its right hand end, as viewed in Figures 1, 3 and 4 so as to provide a pair of arms 25 positioned loosely on opposite sides of the ratchet wheel 14 provided with a series of saw teeth as shown in Figures 3 and 4. The dog 21 is provided with a downwardly extending portion or lip 27 which successively engages the teeth in the ratchet wheel 14.

The ratchet wheel is rigidly connected to the cam 12 formed of insulating material. This cam is circular for its major portion and is provided with a shoulder or notched portion 13, see Figures 1, 3 and 4.

The switch proper comprises a pair of outer arms 30 and 31 and a main or power arm 32 located centrally between 30 and 31. All of these arms are spring arms and are biased towards the cam.

When the thermal element is heated the thermal element or bimetal element moves to the left as indicated in Figure 3 and the finger 27 engages one or more of the teeth of the ratchet wheel 14. This is shown in Figure 3.

When the bimetal member or thermal element 15 cools, it moves, due to its springy nature, towards the right as viewed in Figure 3 and thus advances the cam one step through the action of the pawl or dog 21 and ratchet wheel 14. In the form shown in the drawings it is so arranged that the dog passes two teeth for each operation of the bimetal member. It can pass one tooth if desired or any number but this point will be covered in a simpler manner by calling it one step in the operation of the apparatus.

The switch is provided with a spring arm 33, see Figures 1, 3 and 4. This spring arm or pawl 33 has an inwardly turned finger 34 which locks the ratchet wheel against reverse rotation and allows rotation in the direction indicated by the arrows shown in Figures 1, 3 and 4.

If desired the two lips 25 of the dog 21 may be provided with a pair of inwardly pressed portions of dimple-like depressions 35, as shown in Figures 1, 5 and 6, which are positioned on opposite sides of the ratchet wheel 14 and reduce friction as they bear lightly on the ratchet wheel if they bear at all only at one point for each lip.

Figure 2:
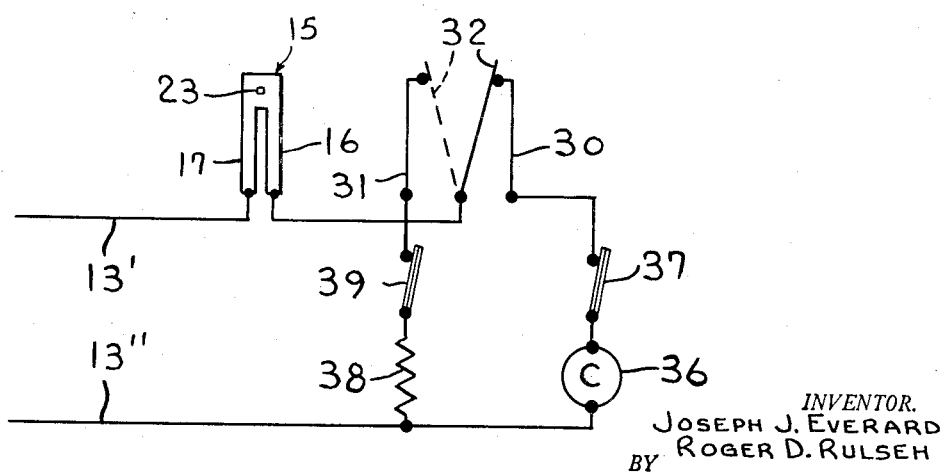
Figure 2 is a wiring diagram.

Referring to the wiring diagram shown in Figure 2, which diagram is particularly designed to represent the manner in which the device is used in an electric refrigerator, it will be seen that the compressor motor is indicated by the reference character 36 and the letter C. The compressor motor is also controlled by a low temperature thermostat 37 so that when the temperature arrives at a low enough point the thermostat 37 opens and stops the compressor motor which drives the compressor of the refrigerating system. On the other hand when the temperature in the refrigerator rises above a predetermined point the thermostat 37 closes and the compressor motor 36 again operates.

The incoming power leads are indicated by the reference characters 13′ and 13″. One of the leads or energy supplying conductors, for example the conductor 13′ is connected to one arm of the bimetal member 15 for instance arm 17 and the other arm 16 of the bimetal member is connected to the center or power contact arm 32 of the thermal element unit.

The right hand spring arm 30 is connected through the low temperature thermostat 37 to the compressor motor 36. The position of the parts shown in Figure 2 is the normal position.

A heater element is indicated by the reference character 38 and is controlled by a high temperature thermostat 39. This high temperature thermostat 39 is connected to the heater element 38 at one end and to the left hand contact arm 31 at its other end. The power contact arm 32 normally occupies the position shown in Figures 2 and 4.

As stated, all of the spring arms 30, 31 and 32 are biased towards the cam 12.

As the cam rotates due to the opening and closing of the circuit of the bimetal element by the one or the other thermostats 37 or 39, the cam is advanced one step.

The outer arms 30 and 31 of the switch are maintained or spaced by means of the shouldered insulating member 40, see Figures 1, 3 and 4. This spacer member 40 passes loosely through the power contact arm 32.

When the cam has been advanced a predetermined distance the inner arm 30 drops off of the shoulder or notch 13 and is positioned as shown in Figure 3. The power contact arm 32 is held out of contact with the compressor motor contact arm 30 and in contact with the heater arm 31. The compressor motor is thereby stopped and the heater heats up to assist in defrosting. When the temperature arrives at the predetermined high point, or in other words when the defrosting is completed, the high temperature thermostat 39 opens and thus interrupts the flow of current through thermal element 15. The thermal element now cools down and as it cools down it moves slowly to the right as viewed in Figures 3 and 4, and advances the cam one unit, thus allowing the power contact arm 32 to drop off of the shoulder 13 or into the notch and to again engage the compressor motor contact arm 30 and to move out of contact with the heater contact arm 31 so that these parts return to the position shown in Figure 4 and the compressor motor is again ready to start.

It will be seen that a system for defrosting the refrigerator has been illustrated in Figure 2 and controlled by the thermally operated cam shown in the remaining figures in such a way that the cam is advanced in a step-by-step manner and when it arrives at a predetermined point will stop the compressor motor and turn on the heater.

The flow of current through the thermal element is controlled by the thermostats 37 and 39. In other words it is primarily controlled by the circuit of the compressor motor 36 and advances the cam for each opening and closing of the circuit of the compressor motor.

This continues as stated until the power arm is separated from the compressor contact arm 30 as shown in Figure 3 at which time the compressor motor stops and the heater 38 is turned on. When the heater thermostat or high temperature thermostat 39 opens, the cam is advanced by the thermal element 15 one step and the parts are restored to their normal position shown in Figures 2 and 4. As the cam rotates the contact arms remain in this position as the cam holds such contact arms in such a position.

It is apparent also that there is a wiping or cleaning action due to the fact that the contact arms are more or less bowed and attempt to return to their initial position, and thus provide a wiping contact at each operation of the thermal element.

It is to be appreciated that unless otherwise limited the thermal element may be replaced by any electromotive element for advancing the cam in a step-by-step manner.

Although the invention has been described in considerable detail it is to be understood that such description is intended as illustrative rather than limiting as the invention may be variously embodied and is to be interpreted as claimed.

We claim:

1. An electric switch comprising a cam, a first contact arm and a contact carried thereby, a second contact arm and a contact carried thereby, a power contact arm located between said first and said second contact arms and having a contact, said arms being rigidly supported at one of their ends and having their other ends movable, a ratchet wheel rigid with said cam and adapted to rotate said cam, a thermal element having a fixed end and a movable end, a ratchet dog pivoted on and carried by the movable end of said thermal element and arranged to move said ratchet wheel for each cycle of heating and cooling of said thermal element, said cam controlling the movable ends of said power contact arm and said second contact arm and controlling the alternate engagement and disengagement of the contact of said power contact arm with the contact of said first and said second contact arms, and a shouldered insulating spacer passing freely through said power contact arm and acting as a spacer for said first and second contact arms.

2. An electric system comprising a first electrically operated means and a second electrically operated means, a source of electric power and an electric switch for alternating connecting said first and second means to said source of electric power, said switch comprising a thermal unit having a movable part arranged to move in one direction when heated and in the other direction when cooled, said thermal unit being connected in series with both said means, a thermostat for each unit of independently opening the circuit of said units, said switch having a first and a second contact means for selectively connecting said first and said second electrically operated means with said source of power and having a cam for controlling the operation of said contact means, a ratchet wheel operatively connected to said cam, and a ratchet dog operated by and supported on the movable part of said thermal unit and coacting with said ratchet wheel for advancing said cam one step each time said thermal unit goes through a cycle of heating and cooling.

References Cited in the file of this patent

UNITED STATES PATENTS

| | | | |
|---|---|---|---|
| 1,742,062 | Day | Dec. 31, | 1929 |
| 1,950,115 | Kuenzli | Mar. 6, | 1934 |
| 2,129,373 | Grooms | Sept. 6, | 1938 |
| 2,276,369 | Buchanan | Mar. 7, | 1942 |
| 2,500,298 | Smith | Mar. 14, | 1950 |
| 2,687,620 | Raney | Aug. 31, | 1954 |
| 2,707,737 | Rich | May 3, | 1955 |
| 2,708,348 | Philipp | May 17, | 1955 |
| 2,867,093 | Simmons | Jan. 8, | 1959 |